Oct. 4, 1932.   A. DINA   1,880,884
METHOD OF AND APPARATUS FOR PROJECTION OF MOTION PICTURES
Filed Dec. 10, 1924   6 Sheets-Sheet 3
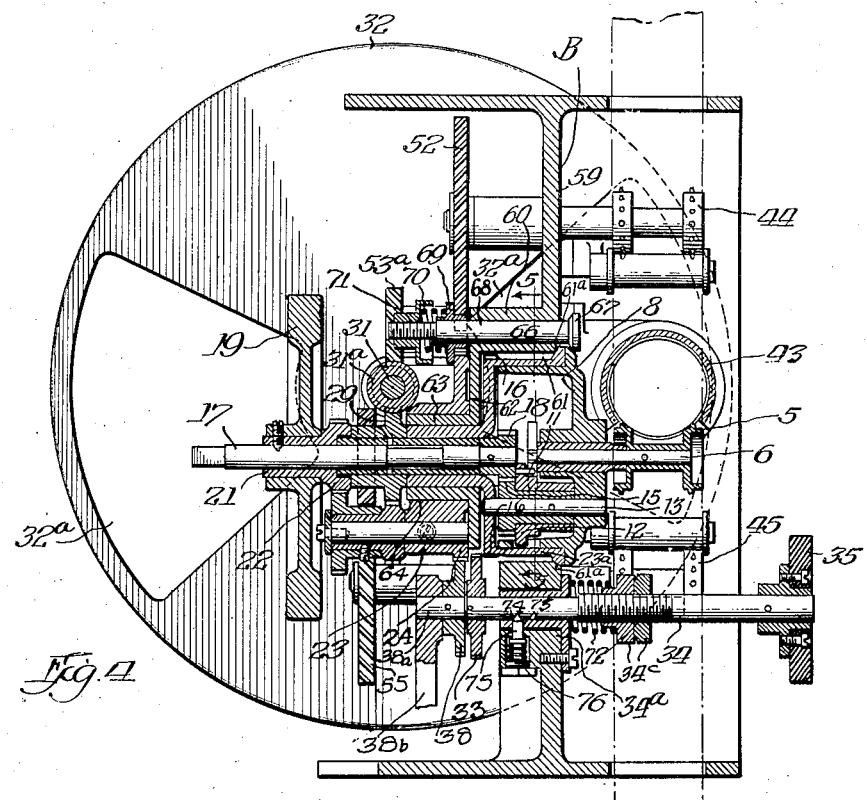
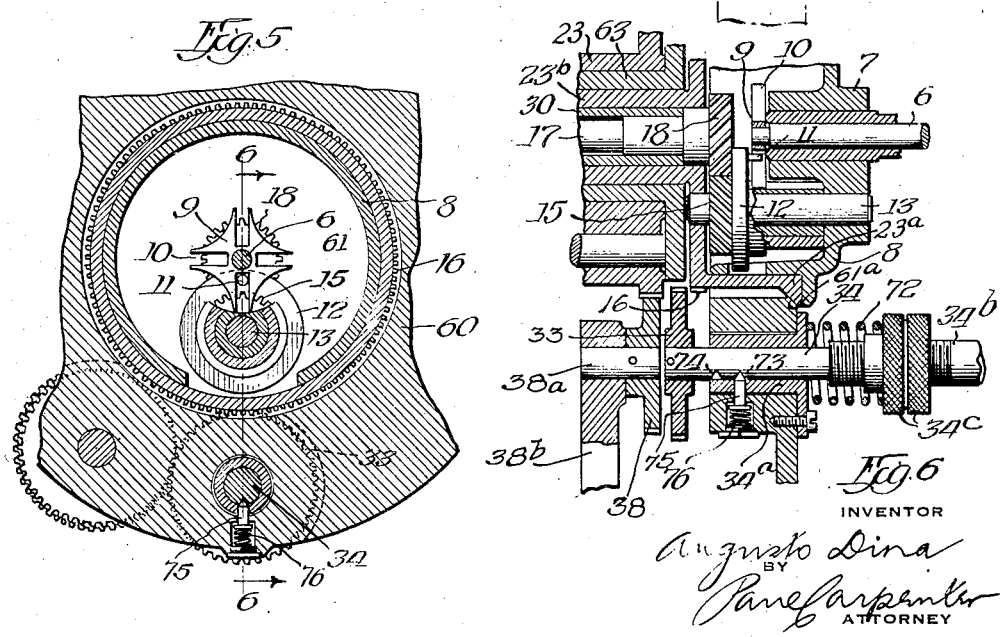
INVENTOR
Augusto Dina
BY
Paul Carpenter
ATTORNEY Oct. 4, 1932.　　　　　　　A. DINA　　　　　　1,880,884
METHOD OF AND APPARATUS FOR PROJECTION OF MOTION PICTURES
Filed Dec. 10, 1924　　　　6 Sheets-Sheet 4
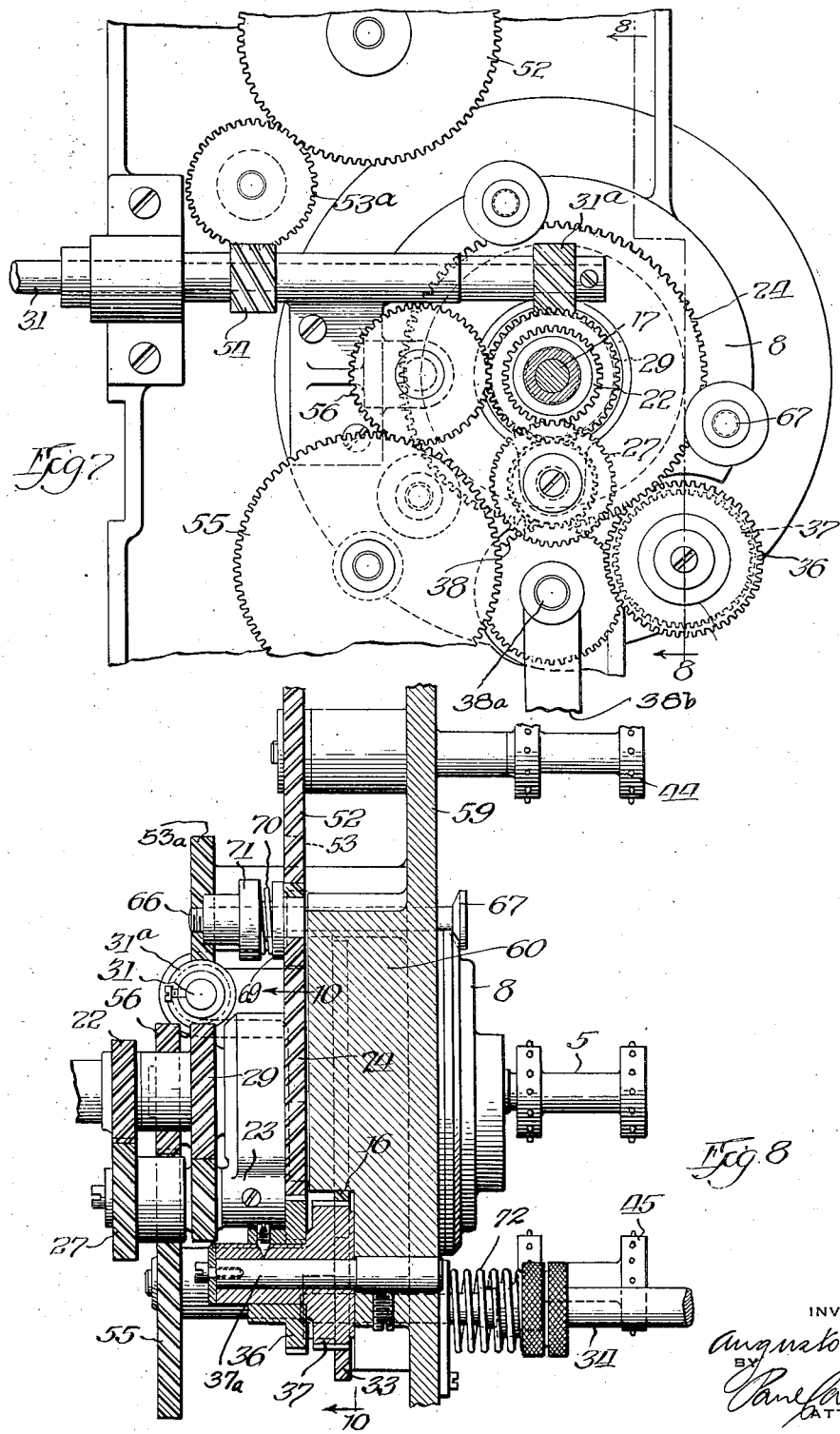
INVENTOR
Augusto Dina
BY
Paul Carpenter
ATTORNEY Oct. 4, 1932.  A. DINA  1,880,884
METHOD OF AND APPARATUS FOR PROJECTION OF MOTION PICTURES
Filed Dec. 10, 1924  6 Sheets-Sheet 5
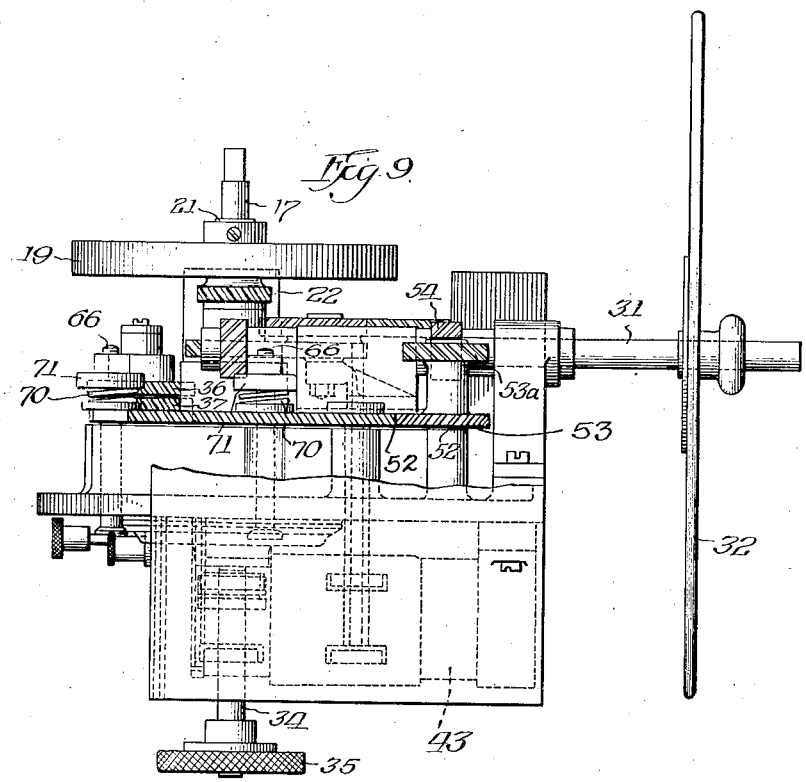
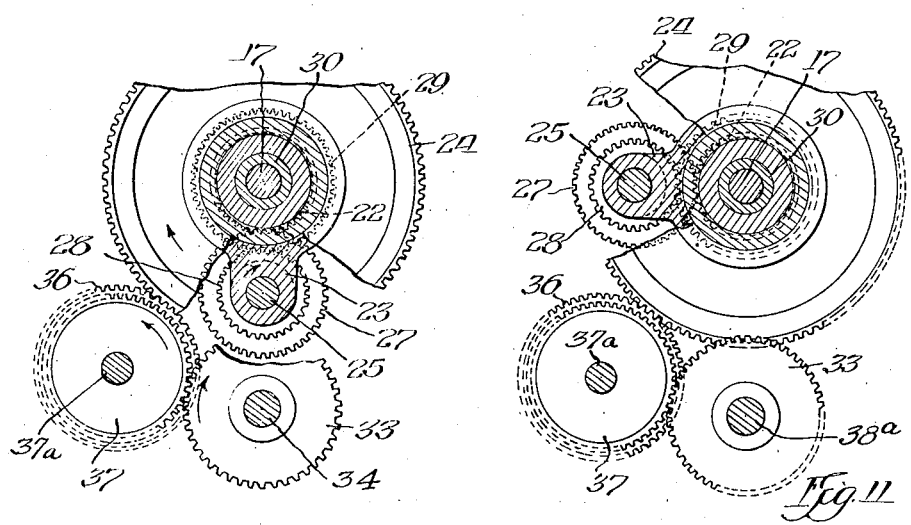
INVENTOR
Augusto Dina
BY
Paul Carpenter
ATTORNEY

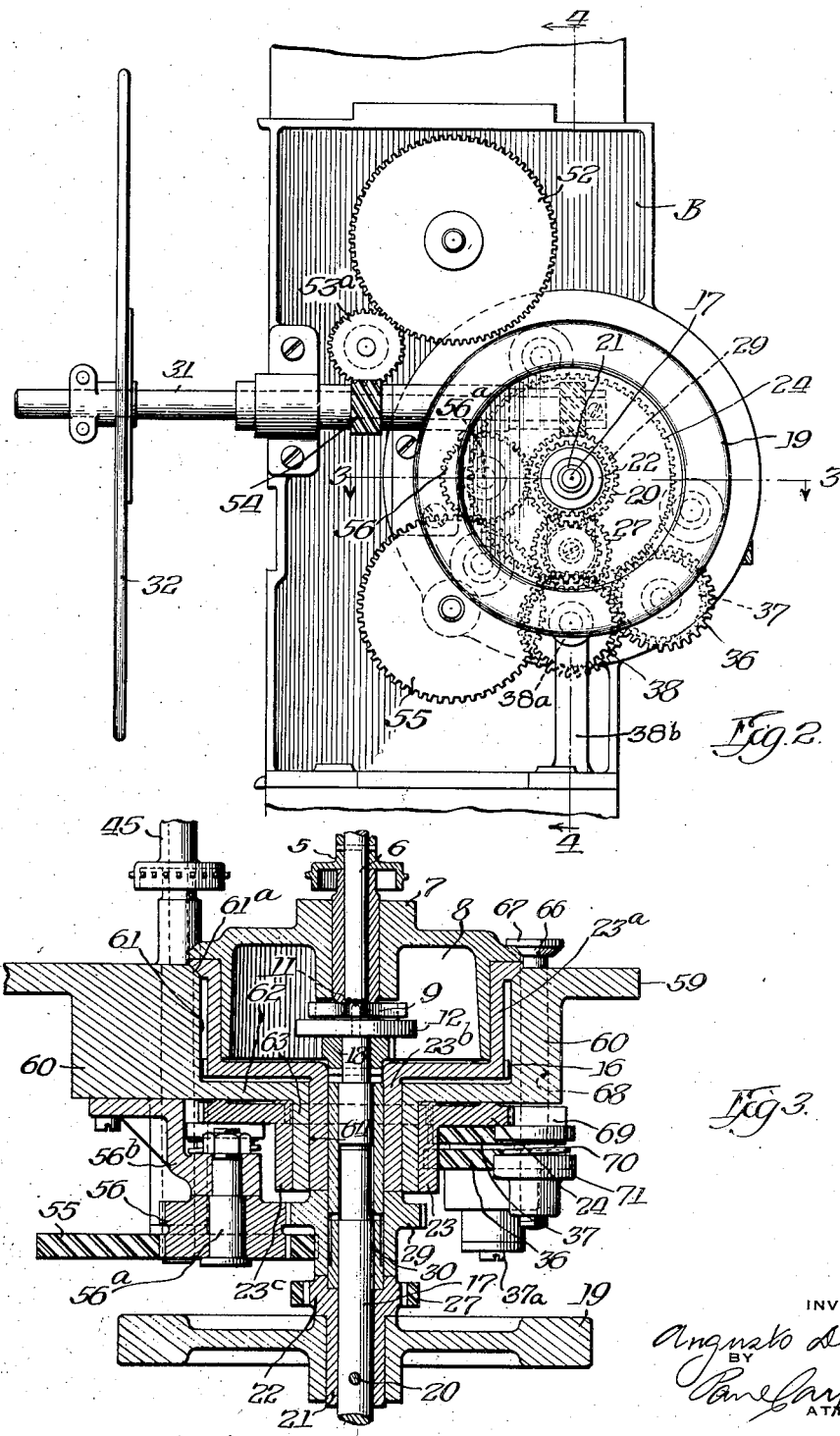

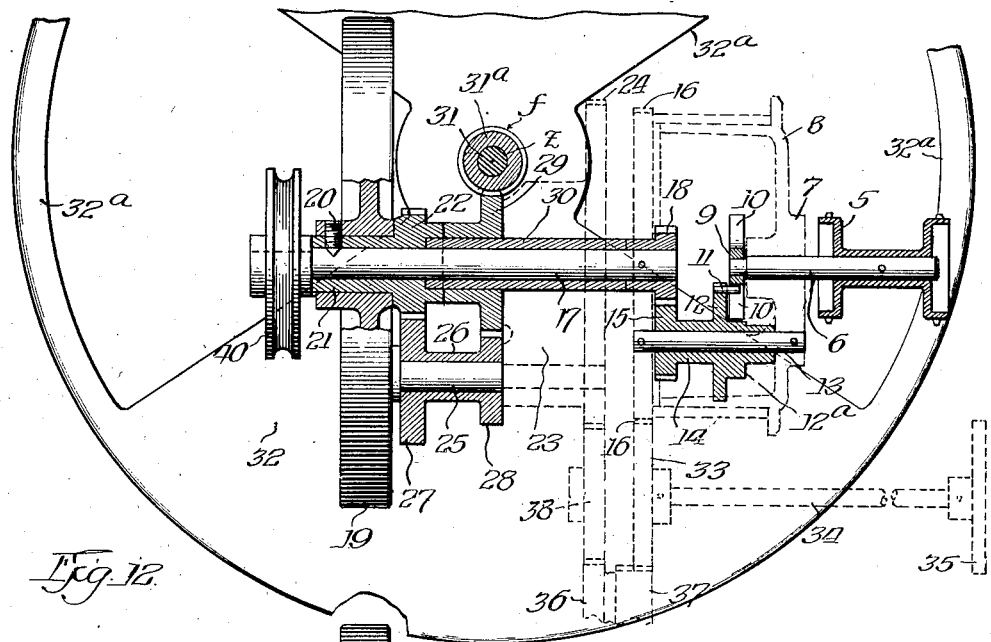
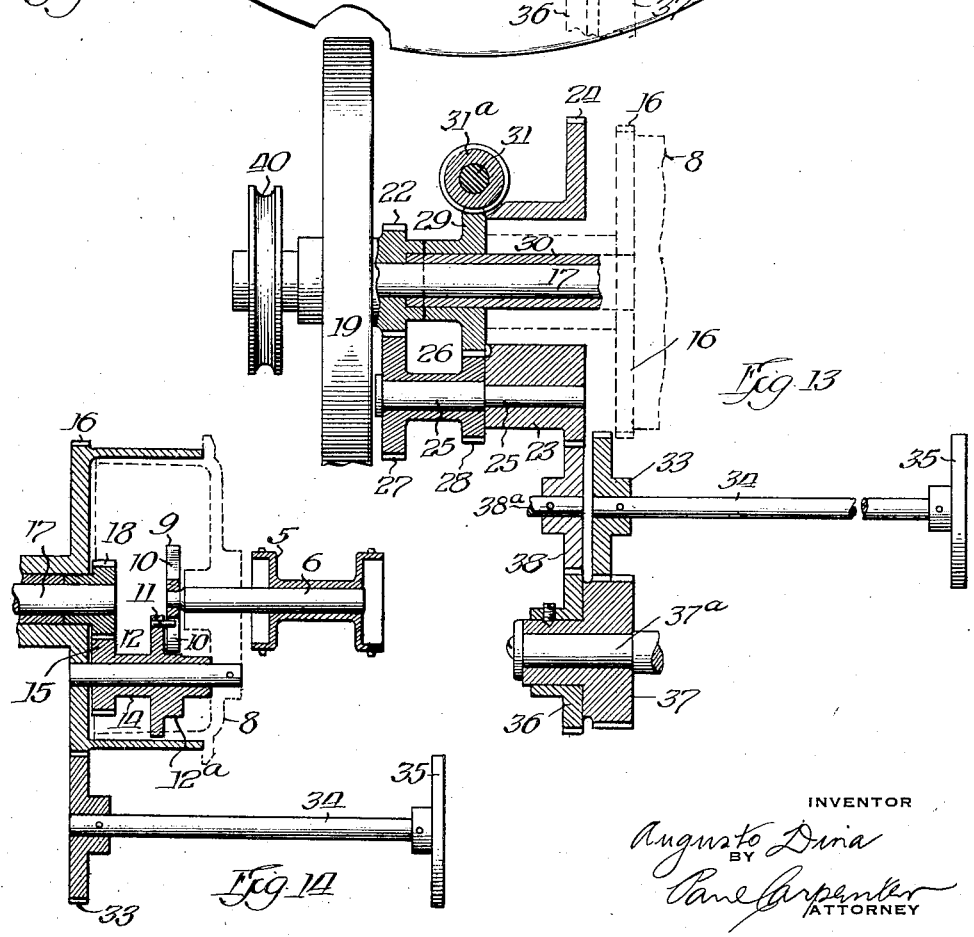

Patented Oct. 4, 1932

1,880,884

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

METHOD OF AND APPARATUS FOR PROJECTION OF MOTION PICTURES

Application filed December 10, 1924. Serial No. 755,079.

This invention relates broadly to motion converting and transmitting, and more particularly to an improved apparatus for transmitting intermittent motion to one element and continuous motion synchronously to another element, more specially for employment in a motion picture projection machine.

While this invention is illustrated and described as employed for moving the film and shutter and for framing in the operation of a motion picture projector, it will be understood that the mechanism may be employed as well for use in the camera and for other purposes, and therefore, as a mechanical movement, finds a wide field of utility.

The principal objects and advantages which characterize this invention reside in the provision of an improved method of and apparatus for transmitting intermittent motion; the provision of an improved method of and apparatus for transmitting motion intermittently to one element and continuously and synchronously to another element; the provision of an improved method of and apparatus for projecting motion pictures; the provision of an improved method of an apparatus for projecting and framing motion pictures; the provision of an improved method of and apparatus for moving a continuous strip relatively to an opening; the provision of an improved method of and apparatus for moving a continuous strip relatively to an opening and to a shutter and for synchronizing the movement of said shutter and said strip; the provision of an improved method of and apparatus for moving a motion picture film, and a shutter, and for framing said film and synchronizing said shutter therewith.

This invention is further characterized by the provision of an improved apparatus for projecting motion pictures and for framing the film; the provision of an improved apparatus for moving a motion picture film and for framing the film without disturbing its periodicity; the provision of an improved apparatus for moving a motion picture film, for framing the same, and for adjusting the shutter relatively to the degree of displacement of the film for framing; the provision of an improved apparatus for moving a motion picture film, and a shutter, all characterized by the provision of an improved framing device and means for synchronizing the shutter automatically with the framing of the picture.

This invention is still further characterized by the provision of an improved apparatus including a framing device, a shutter and a film driving sprocket, in combination with means for imparting a partial rotation to said sprocket without disturbing the periodicity of said shutter to bring the shutter and the film into synchronism; the provision of the combination, in improved form, of a framing device and a shutter and means for synchronizing said shutter and framing device; the provision of the combination of a framing device, a shutter, and a film driving sprocket, and means for imparting a partial rotation to said shutter without disturbing the operation of said sprocket; the provision of apparatus of the character described including a gear train having a portion thereof displaceable epicyclically for framing the picture and for synchronizing the shutter therewith.

Another important feature of this invention resides in the provision of an apparatus for framing a motion picture and for synchronizing the shutter therewith which includes a gear train, at least two of the gears thereof being non-spur or spiral gears for permitting desired variations in speed ratio between the various elements, and for reducing the play of the apparatus and the noise accompanying the operation of gearing, and in fact readily attaining the solution of problems involved in such ratios which are otherwise unsolvable for standard gear pitches, thus effecting great savings in the cost of manufacture of gearing for my present purposes, as well as of time.

It is also an object of this invention to provide means of the character referred to in which the framing mechanism may be removed as a unit for repair or adjustment and in which the working parts thereof are substantially entirely enclosed to exclude dust and to retain a lubricant.

The foregoing and such other objects and advantages as may appear or be pointed out as this description proceeds are attained in the structural embodiment illustrated in the accompanying drawings, in which:

Figure 2 is a fragmentary side elevational view of the device of this invention viewed from the opposite side of the showing in Figure 1;

Figure 3 is a horizontal sectional view taken on line 3—3 of Figure 2, looking in the direction indicated by the arrows;

Figure 4 is a vertical sectional view taken on the line 4—4 of Figure 2, looking in the direction indicated by the arrows;

Figure 5 is a fragmentary enlarged vertical sectional view taken on line 5—5 of Figure 4, looking in the direction indicated by the arrows;

Figure 6 is a fragmentary enlarged sectional view taken on line 6—6 of Figure 5, looking in the direction indicated by the arrows;

Figure 7 is a fragmentary enlarged side elevational view of the apparatus from the opposite side of that shown in Figure 1;

Figure 8 is a fragmentary vertical sectional view taken on the line 8—8 of Figure 7, looking in the direction indicated by the arrows;

Figure 9 is a plan view of the apparatus;

Figure 10 is an enlarged fragmentary vertical view taken on the line 10—10 of Figure 8, looking in the direction indicated by the arrows;

Figure 11 is a view similar to Figure 10 showing the parts in a different position; and Figures 12, 13 and 14 are schematic views illustrating the framing and compensating mechanism which is incorporated in the structures of Figures 1 to 11 both inclusive.

Figure 1:
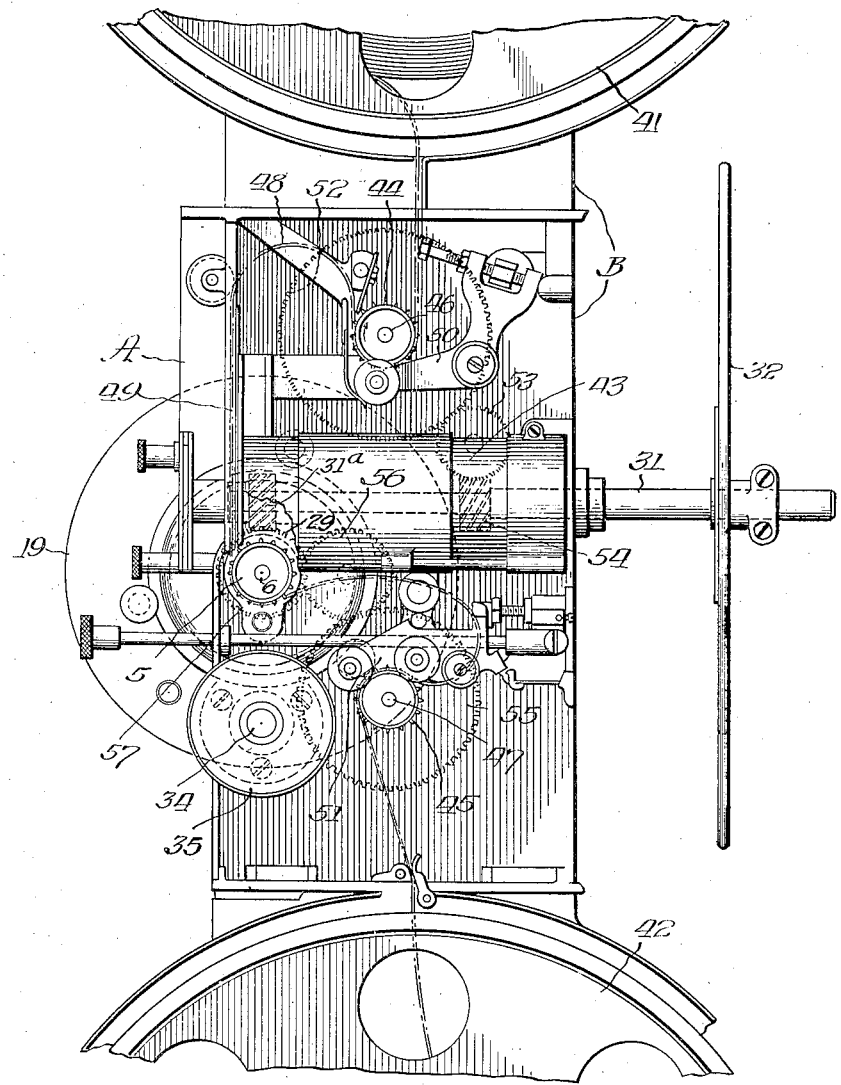
Figure 1 is a fragmentary side elevational view of the device of this invention.

Referring first to Figures 10, 11, 12, 13 and 14, which illustrates the invention in schematic form, a propelling sprocket 5 of the conventional form for intermittently moving a motion picture film (not shown) is provided, said sprocket being fixedly mounted upon and rotatable with the shaft 6, which latter is rotatably mounted in a suitable bearing 7 forming axially in the casing portion 8 a framing device, presently to be described.

It will be understood that the frame usually provided, through which the film passes, is omitted in these figures although it appears in other figures of the drawings.

The inner end of the shaft 6 carries a star wheel 9, having a plurality of radial slots 10, in which the pin or projection 11 of the pin wheel 12 is adapted to successively engage for intermittently propelling the star wheel and said shaft 6.

The pin wheel 12 is rotatably mounted upon a displaceable planetary shaft 13, the pin wheel having a hub portion 14 carrying a pinion 15. The casing 8 is provided with a rear wall having external gear teeth to form a spur gear 16, and the shaft 13 is fixedly supported by the front and rear portions of the casing 8 of the framing device.

A drive shaft 17 extends into the casing of the framing device, and a pinion 18 is fixedly secured to said shaft and meshes with the pinion 15. The shaft 17 is supported in suitable bearings, omitted from Figures 12, 13 and 14 for clearness, and a balance wheel 19 is fixedly secured to said shaft by a set screw 20. The set screw 20 passes through the hub portion 21 of a pinion 22 for fixedly attaching the latter to the shaft 17.

The compensating mechanism includes a hub 23 carrying a gear 24, said hub having a planetary shaft 25, said shaft having a double gear member 26 freely rotatable thereon and including the pinions or gears 27 and 28, the former meshing with the pinion 22. The gear 28 meshes with a gear 29 freely rotatable upon a spacing sleeve 30 on the drive shaft 17, said gear 29 being maintained against endwise movement by the hub 23 and gear or pinion 22.

The gear 29 meshes with and may serve to drive or be driven by the shaft 31, by means of a worm 31a arranged normal thereto, said shaft 31 serving to support the shutter 32, having openings 32a (Figure 4) which is adapted to operate across the projected rays as in the conventional motion picture projector.

The framing mechanism gear 16 and the compensating mechanism gear 24 are operatively connected for simultaneous operation by the provision of a shiftable or floating gear 33 carried by a longitudinally movable shaft 34 having a handle 35, whereby said gear 33 may be moved into or out of mesh with the gear 16.

Reversing gears 36 and 37 are provided, mounted on shaft 37a fixed in the portion 60, and an auxiliary gear 38 mounted on shaft 38a in a pedestal 38b serves to connect gears 24 and 36. The pedestal 38b is supported on the base of the machine. Thus when the gear 33 is in mesh with gears 16 and 37, as seen, the gears 24 and 16 will operate in unison.

This arrangement, (as shown in Figure 12), permits the operator to simultaneously "frame the picture"; and shift the shutter compensating mechanism, or if this does not give the desired result, then (as shown in Figure 13) the gear 33 may be shifted and rotated for independently adjusting the compensating mechanism to bring the shutter into proper synchronism with the intermittent film feeding mechanism. Normally, any framing of the picture will be accompanied by a compensation of the shutter position so as to properly coordinate these elements.

In the operation of the framing and compensating mechanism shown in Figures 12, 13 and 14, the shaft 17, assuming that this is the driving shaft, driven by a pulley 40 imparts continuous rotation to the gear 22 and to the pinion 18. The gear 22 imparts continuous rotation to the double gear member 26 through the gear 27, which in turn imparts continuous rotation to the gear 29, thence to the shaft 31 by means of the worm 31a. Similarly, the gear 15 is rotated continuously, in turn imparting continuous rotation to the pin wheel 12.

As the pin 11 on the pin wheel passes through its path of travel it engages in the slots 10 of the star wheel 9 in succession, the hub 12a of said pin wheel engaging the star wheel to block the same between each of its increments of movement. This results in an intermittent motion of the shaft 6 and a corresponding movement of the sprocket 5.

When it is desired to frame the picture, the shaft 34 is rotated, thus imparting rotation to the gear 16 and the casing 8, which causes the planetary gear 15 and the pin wheel 12 to pass through an epicyclic movement about the axis of the shaft 6 and thus displace the pin 11 circumferentially and in turn impart a partial rotation to the shaft 6 and sprocket 5 independently of the normal rotation thereof produced by the pin wheel. This will cause a displacement of the sprocket teeth with respect to a given lineal movement of the film and thus change the point of stoppage of the film in order to frame the picture.

When such adjustment takes place it is essential that the shutter be operated synchronously with the movement of the film and in the ordinary framing of the picture this synchronism is destroyed, resulting in a blurring or fogging of the picture due to the fact that the shutter moves into position at the wrong time.

In order to obviate this difficulty the shutter is arranged so that its driving mechanism may be epicyclically displaced with respect to the axis of the shaft 17, that is, the double gear member 26 will be moved circumferentially about the gears 22 and 29, thus retarding or advancing the shutter. This takes place automatically by virtue of the gears 33, 38 and reversing gears 37 and 36, and the connection of these gears into train with the gears 16 and 24.

In the event that it is desired to correct a discrepancy in the operation of the shutter subsequent to a simultaneous movement of the framing and compensating mechanisms without disturbing the framing of the picture, the shaft 34 may be slid to the left as viewed in Figure 13, against the tension of spring 72 (see Figs. 4 and 6) and a partial rotation thereof produced by handle 35 which will change the normal position of the shaft 25 and thus epicyclically displace the gears 27 and 28 about the axis of shaft 17 and thus advance or retard the shutter as desired.

As will hereinafter appear, I provide various mechanical elements which further go to make up the device when employed in a motion picture projection apparatus, the parts just described being more of a nucleus or foundation about which the other elements are built up, it being kept in mind that any adjustment of the gears 16 or 24 is maintained in a fixed position by suitable means which will presently be described.

Referring now to Figures 1 to 11, the structure illustrated in Figures 12, 13 and 14 is incorporated in an operative structure which, as shown in Figure 1, includes the reel containers 41 and 42 supporting the projection mechanism generally designated A carried by a casting or other suitable supporting structure B.

The projection mechanism includes a conventional form of condensing lens and objective supported in an adjustable housing 43 carried by the casting B as shown in Figures 1, 4 and 9.

The casting B supports the film feeding sprockets 44 and 45 on suitable shafts 46 and 47, respectively, as best shown on Figures 1 and 4. The sprocket 44 is adapted to engage with and propel the film 48 from the container 41, and the sprocket 45 is adapted to receive said film after its passage through the frame 49 and over the intermittent sprocket 5 and deliver said film in the conventional manner to the receiving container 42.

The sprockets 44 and 45 each are provided with complemental guiding members 50 and 51, respectively, which cooperate to maintain the film enmeshed with said sprockets, these guiding or retaining members being of a form not wholly essential to the present invention and need not be described in detail here.

The sprocket 44 receives continuous motion in operation by the provision of a train of gears including the spiral gears 52, spiral pinion 53 meshing therewith, and moving a complemental pinion 53a which latter meshes with a worm 54 on the shutter shaft 31. The sprocket 45 receives continuous motion by means of a train of gearing including the spiral gear 55, spiral pinion 56, and the spiral gear 29 mounted and rotatable upon the sleeve 30. The pinion 56 is mounted on removable bearing 56a carried in a bracket 56b on the enlargement 60. Thus the two sprockets 44 and 45 are caused to rotate continuously at substantially the same speed.

As shown in Figure 1, the sprocket 5 is located immediately below the bottom end of the frame 49 and the relationship of the axis of said sprocket to said frame remains fixed, that is, the periphery of the sprocket 5 remains substantially tangential to the plane of the frame 49.

Reverting now to the structural embodiment of the framing and compensating mechanisms previously described, reference may be had to Figures 2 to 6, it being observed from Figure 4 that the supporting casting B is provided with a web portion 59, which for the present purposes is arranged in a vertical plane and serves to support substantially in its entirety the projection mechanism. The web 59 is provided with an enlarged or thickened portion 60 substantially intermediate its height, said intermediate portion being provided with a recess 61 forming a pocket for reception of the casing 8 which encloses the intermittent couple and said enlarged portion having an inner wall 62 provided with an annular flange 63 which forms a bearing 64 for the hub member 23 previously described, and for the hub 23b of the gear 16.

From Figures 3 and 4 it will be noted that the front portion of the casing 8 is receivable within the annular flange 23a formed on the gear 16, so that a separable structure is provided affording access to the intermittent couple for repair, replacement or adjustment when desired or necessary.

The casing 8 and its associated parts are, of course, revoluble in the opening 61, and for this purpose a bearing face 61a is provided, the casing 8 being retained against outward displacement by the provision of a series of yieldingly mounted flanking members of which three are shown arranged at substantially 120 degrees apart and including the bolt members 66 having heads 67 which engage the peripheral margin of the casing 8, said bolts projecting through suitable opening 68 provided in the enlarged portion 60 and being retained yieldingly in position by the provision of an abutment collar 69, helical spring 70 and a retaining nut 71 for adjusting the tension of said spring. The members 66 perform the function of holding the casing in an adjusted position as well as preventing its accidental outward displacement, and also, as will be seen in Figures 2 and 4, serve to retain the gear 24 in position, the latter being provided with the hub 23, and operating on the member 63 as a bearing.

As shown in Figures 2 to 6, inclusive, the gear 56 is a multiple gear for the reason that a desired ratio may be advantageously attained by the employment of teeth at different angles without varying the size of the gears. This arrangement of gears is adhered to substantially throughout all of the gears described for the reasons; namely, less noise and lost motion accompanies the operation of spiral gears, and the desired ratios between the various gears may more readily be attained, thus permitting of materially reducing the number and size of the gears and producing a more compact mechanism.

Upon reference to Figures 4, 5 and 6, the preferred arrangement of the shifting gear 33 may be understood. The shaft 34 operating in the bearing 34a is conveniently formed with an enlarged threaded portion 34b, on which the nuts 34c are mounted, a helical spring 72 being disposed about the shaft 34 between said nuts and the bearing 34a, and tending to maintain the gear 33 in a predetermined position.

The shaft 34 is provided with notches 73 and 74 and a pin 75 is pressed by a spring 76 into either one of said notches for holding the shaft in predetermined position.

Having thus described my invention and illustrated its use, what I claim as new and desire to secure by Letters Patent is:—

1. In a motion picture projector, the combination of a framing device and a shutter, a film feeding sprocket, an intermittent couple for driving said sprocket including a differential gear train, means for driving said shutter including a portion of said differential gear train, and an auxiliary gear train for imparting a partial rotation to said shutter independently of said sprocket.

2. In a motion picture projector, the combination of a framing device and a shutter, a film feeding sprocket, an intermittent couple for driving said sprocket including a differential gear train coaxially disposed with respect to said sprocket, means for driving said shutter including a portion of said differential gear train, and an auxiliary gear train for imparting a partial rotation to said shutter independently of said sprocket.

3. In a device of the character described, in combination, a supporting frame having a recess therein open on one side and having an inner wall provided with an axial bearing, a housing removably axially disposed for rotation within said recess and having an inner hub portion lying in said bearing, a driving shaft projecting into said hub portion and having a bearing therein, an intermittent couple in said housing having a part driven by said shaft, and an element to be driven connected to said driven part.

4. In a device of the character described, in combination, a supporting frame having a recess therein open on one side and having an inner wall provided with an axial bearing, a housing removably axially disposed for rotation within said recess and having an inner hub portion lying in said bearing, said housing having two nested portions, means on said frame for retaining one of said nested portions and thereby holding said housing in operative position, a driving shaft projecting into said hub portion and having a bearing therein, an intermittent couple in said housing having a part driven by said shaft, and an element to be driven connected to said driven part.

5. In a device of the character described, in combination, a film feeding sprocket, a driving shaft, an intermittent couple connecting said sprocket to said driving shaft, a shutter shaft, a train of gearing connecting said shutter to said driving shaft, and means for displacing said train of gearing for synchronizing said shutter, said means being disconnectibly connected with the intermittent couple so that said shutter may be independently adjusted.

6. In a motion picture projector, the combination of a framing mechanism and a shutter, a film feeding sprocket and driving means therefor including an intermittent couple and a planetary gear train, driving means for the shutter including a shaft and a planetary gear train, and means connected to both of said gear trains for simultaneously adjusting said intermittent couple and shutter, said means being displaceable for permitting independent adjustment of said shutter.

7. In a device of the character described, the combination of a framing device and a shutter, a film driving sprocket, and means for synchronizing said shutter with said framing device which includes two differential gear trains, and means including sliding gearing so connected as to permit independent adjustment of said shutter or joint adjustment of the latter and said sprocket.

8. In a device of the character described, a film driving element, and an intermittent couple and a driver, gearing for imparting variable motion about the axis of said driving element, a housing including two relative movable parts for encompassing said couple and said gearing, a shutter synchronously operable with said film driving element, gearing for driving said shutter, and means engaging one of the parts of said housing for imparting motion thereto and to said first mentioned gearing, said means including gearing shiftable and thereby being operable to simultaneously adjust the gearings for concurrently adjusting said film driving element and shutter, said gearing being slidable for independently adjusting said shutter.

AUGUSTO DINA.